United States Patent
Ogawa et al.

(10) Patent No.: US 7,489,663 B2
(45) Date of Patent: Feb. 10, 2009

(54) CDMA WIRELESS TRANSMISSION APPARATUS, CDMA WIRELESS TRANSMITTER-RECEIVER SYSTEM AND TRANSMISSION POWER CONTROL METHOD OF THE CDMA WIRELESS TRANSMISSION APPARATUS

(75) Inventors: Shinsuke Ogawa, Kanagawa (JP); Yukihiko Okumura, Kanagawa (JP); Akihiro Higashi, Kanagawa (JP)

(73) Assignee: NTT DoCoMo, Chiyoda-ku, Tokyo (JP)

( * ) Notice: Subject to any disclaimer, the term of this patent is extended or adjusted under 35 U.S.C. 154(b) by 747 days.

(21) Appl. No.: 09/950,763

(22) Filed: Sep. 12, 2001

(65) Prior Publication Data
US 2002/0071408 A1 Jun. 13, 2002

(30) Foreign Application Priority Data
Sep. 12, 2000 (JP) ............................. 2000-277350

(51) Int. Cl.
*H04B 7/216* (2006.01)
(52) U.S. Cl. ...................................... 370/335; 455/522
(58) Field of Classification Search ................. 370/335, 370/342, 252, 328, 338; 455/69, 522
See application file for complete search history.

(56) References Cited

U.S. PATENT DOCUMENTS

| | | | | |
|---|---|---|---|---|
| 5,404,376 A | | 4/1995 | Dent | 375/200 |
| 5,566,165 A | * | 10/1996 | Sawahashi et al. | 370/342 |
| 5,670,964 A | | 9/1997 | Dent | |
| 5,732,328 A | * | 3/1998 | Mitra et al. | 455/69 |
| 5,887,245 A | * | 3/1999 | Lindroth et al. | 455/69 |
| 5,956,649 A | * | 9/1999 | Mitra et al. | 455/522 |
| 6,101,179 A | * | 8/2000 | Soliman | 370/342 |
| 6,104,933 A | | 8/2000 | Frodigh et al. | 455/522 |

(Continued)

FOREIGN PATENT DOCUMENTS

EP 0 479 745 A1 9/1991

(Continued)

OTHER PUBLICATIONS

M. Hata, "Empirical Formula For Propagation Loss In Land Mobile Radio Services", IEEE Transactions On Vehicular Technolgoy, vol. VT-29, No. 3, Aug. 1980, pp. 317-325.

(Continued)

*Primary Examiner*—Firmin Backer
*Assistant Examiner*—Christine Ng
(74) *Attorney, Agent, or Firm*—Workman Nydegger (57) ABSTRACT

A control for varying a maximum transmission power of a transmitter according to a propagation loss or a distance between the transmitter and a receiver is made possible to reduce deterioration of a user capacity to a minimum. In a wave propagation loss measurement section, a calculation is performed on the basis of an amplification factor of a reception amplifier, amplitude information and a base station transmission power information of a reception baseband signal to calculate a wave propagation loss of a reception signal, thereby estimating a propagation loss of transmission signal. The wave propagation loss information is inputted to a maximum amplification amount designation circuit to decide a maximum amplification factor. The maximum amplification amount designation circuit adjusts a maximum transmission power of the transmission signal by designating the decided maximum amplification factor to a transmission amplifier.

4 Claims, 7 Drawing Sheets

U.S. PATENT DOCUMENTS

| | | | |
|---|---|---|---|
| 6,343,206 B1 * | 1/2002 | Miya et al. | 455/69 |
| 6,377,785 B1 * | 4/2002 | Ogino | 455/127.5 |
| 6,597,723 B1 * | 7/2003 | Zeira et al. | 375/130 |
| 6,628,956 B2 * | 9/2003 | Bark et al. | 455/522 |
| 6,745,045 B2 * | 6/2004 | Terry et al. | 455/522 |

FOREIGN PATENT DOCUMENTS

| | | |
|---|---|---|
| EP | 0 532 383 A1 | 9/1992 |
| EP | 0741467 A2 | 11/1996 |
| EP | 0 863 619 | 9/1998 |
| EP | 0 863 619 A1 | 9/1998 |
| EP | 0 883 250 A2 | 12/1998 |
| EP | 0 977 371 A2 | 2/2000 |
| EP | 1 024 606 | 8/2000 |
| EP | 1 024 606 A2 | 8/2000 |
| JP | 5 308318 | 11/1993 |
| JP | 2001-223636 | 8/2001 |
| WO | WO 00/33478 | 6/2000 |

OTHER PUBLICATIONS

Partial European Search Report for application No. EP 01 30 7717, May 17, 2002.

Official Notice of Rejection; Case No. DCMH120109; Patent Application No. 2000-277350.

* cited by examiner

| L Prop [dB] | A Tx_Max [dB] |
|---|---|
| 60 | -60 |
| 70 | -50 |
| 80 | -40 |
| 90 | -30 |
| 100 | -20 |
| 110 | -10 |
| 120 | 0 |
| 130 | +10 |
| 140 | +20 |

CDMA WIRELESS TRANSMISSION APPARATUS, CDMA WIRELESS TRANSMITTER-RECEIVER SYSTEM AND TRANSMISSION POWER CONTROL METHOD OF THE CDMA WIRELESS TRANSMISSION APPARATUS

This application claims priority under 35 U.S.C. 119 to Patent Application No. 2000-277350 filed Sep. 12, 2000 in Japan, the content of which is incorporated hereinto by reference.

BACKGROUND OF THE INVENTION

1. Field of the Invention

The present invention relates to a CDMA wireless transmission apparatus, a CDMA wireless transmitter-receiver system and transmission power control method of the CDMA wireless transmission apparatus, more specifically to a CDMA wireless transmission apparatus which is possible to determine a maximum value of transmission power of a mobile station and/or a base station according to propagation loss between the base station and the mobile station, a CDMA wireless transmitter-receiver system and transmission power control method of the CDMA wireless transmission apparatus.

2. Description of the Related Art

Figure 1:
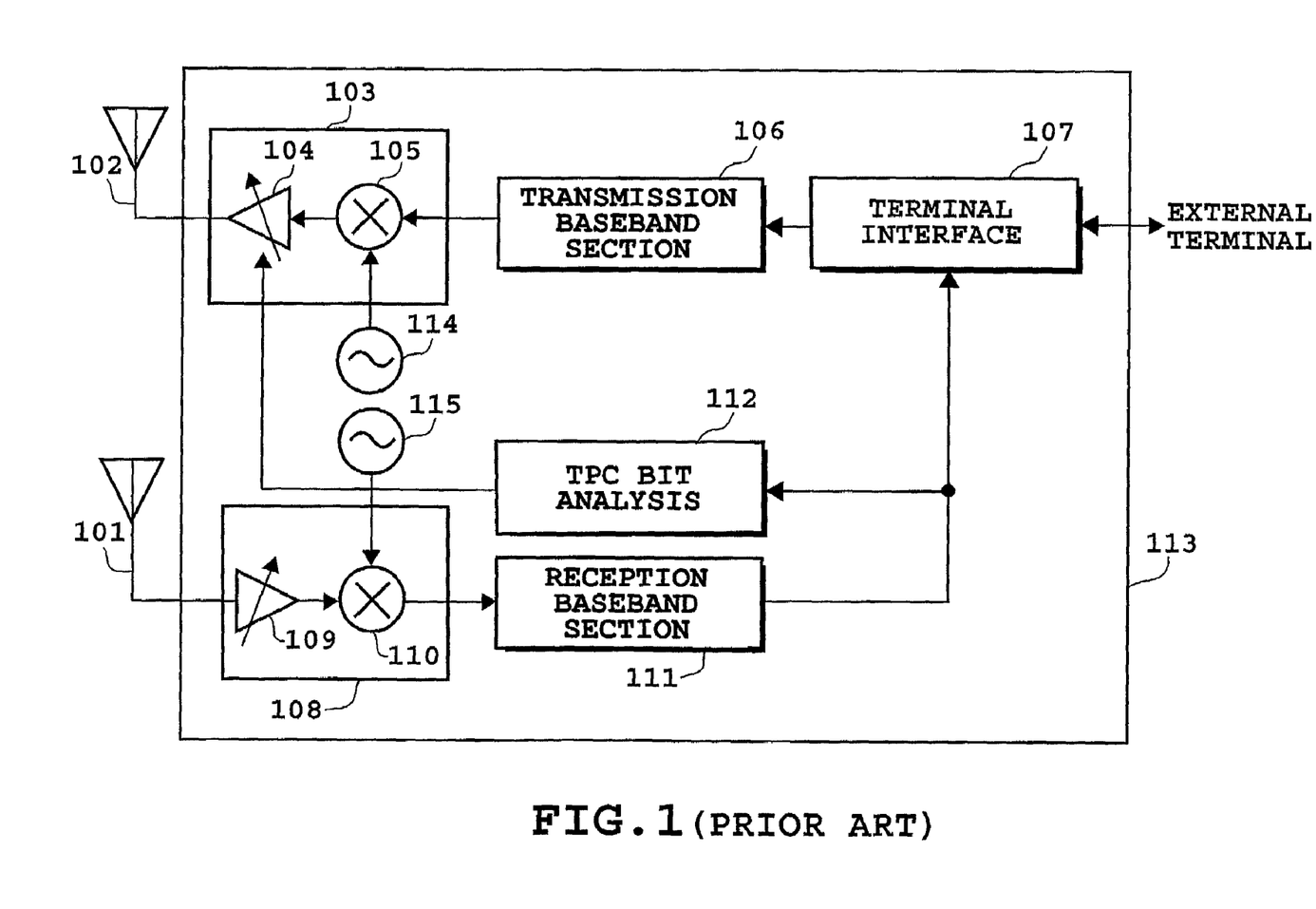
FIG. 1 is a diagram showing an example of construction of a mobile communication machine used in a conventional mobile communication system.

FIG. 1 shows an example of construction of a mobile communication machine used in the conventional mobile communication system.

In the mobile communication system, a circular small wireless zone (cell) is formed for each base station, the mobile station communicates with the base station in the cell where the mobile station itself is present. A transmitter-receiver of a mobile station 113 is inputted with a radio-frequency signal from a reception antenna 101, which is inputted to a reception wireless section 108. The reception wireless section 108 comprises a reception amplifier 109 and a mixer 110, in which the radio-frequency signal is amplified by the reception amplifier 109 in the reception wireless section 108, and converted to a baseband signal in the mixer 110. The baseband signal is inputted to a reception baseband section 111 and converted into a reception data.

The reception data is inputted in a terminal interface section 107, where it is converted to a user data which can be interpreted by an external terminal such as telephone or video-phone, and then outputted to the external terminal. In a TPC bit analyzer 112, TPC bit inserted in the user data is analyzed. The TPC bit is a transmission power control data instructing the mobile station a transmission power to the communicating station, and the mobile station controls the transmission power according to the instruction. When the TPC bit is "00", the transmission amplifier 103 is controlled to increase the transmission power by +1 dB, or when the TPC bit is "11", the transmission amplifier 103 is controlled to decrease the transmission power by −1 dB.

On the other hand, when a wave is transmitted from the mobile station, the user data inputted from the external terminal is converted into a transmission data by the terminal interface 107, and the transmission data is inputted from the terminal interface 107 to a transmission baseband section 106. In the transmission baseband section 106, the transmission data is converted into a baseband signal and inputted to a transmission wireless section 103. The transmission wireless section 103 is provided with an amplifier 104 and a mixer 105, whereby the baseband signal is converted into a radio-frequency signal by the mixer 105, and, in the amplifier 104, the radio-frequency signal is amplified according to an instruction value from a TPC bit analyzer 112. Then, the radio-frequency signal is inputted from the transmission wireless section 103 to the transmission antenna 102, and a radiowave is transmitted from the transmission antenna 102.

Figure 2:
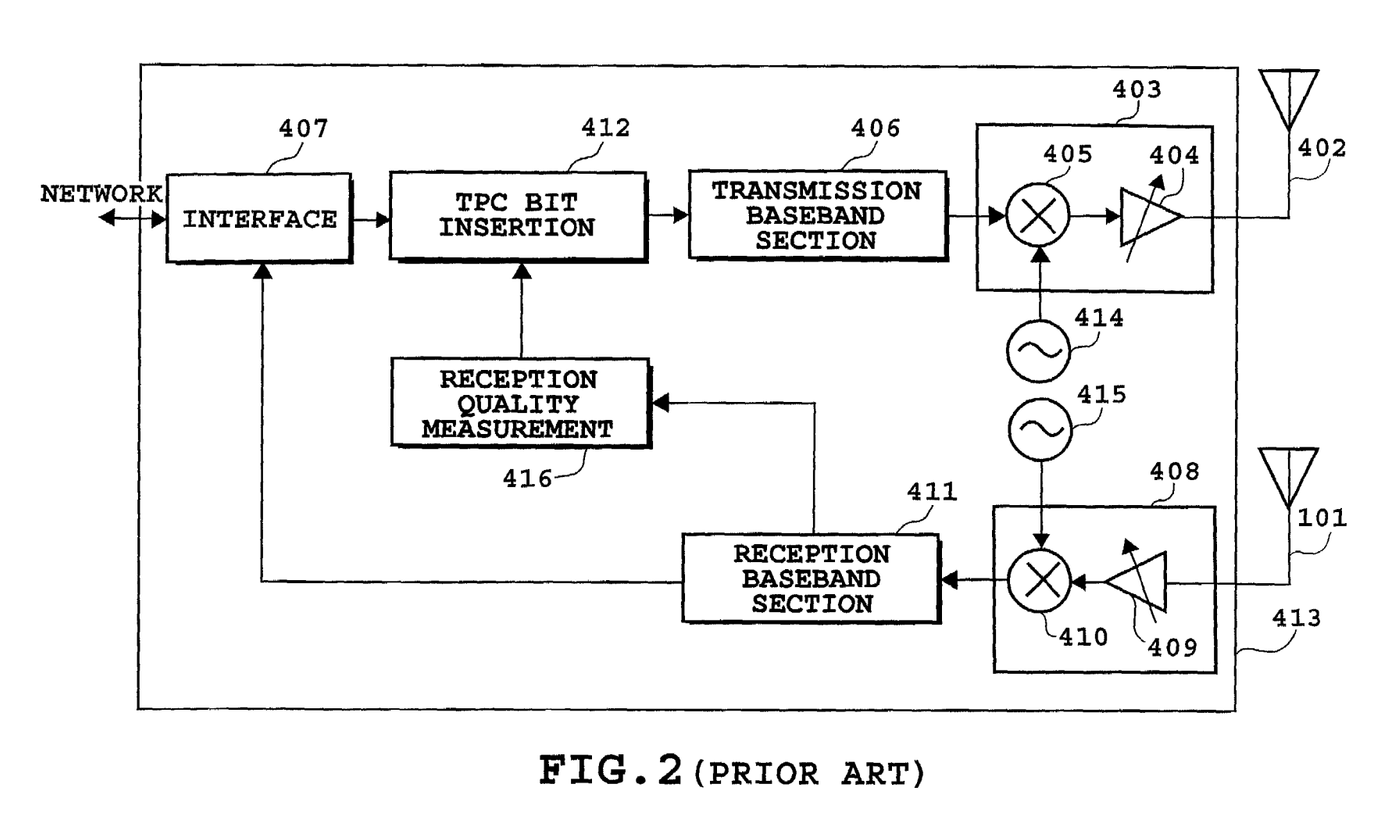
FIG. 2 is a diagram showing an example of construction of a base station used in a conventional mobile communication system.

FIG. 2 is a diagram showing an example of construction of a base station used in the conventional mobile communication system.

The signal transmitted from the antenna 102 of the mobile station 113 is inputted to the reception antenna 401 of a base station 413, and then to a reception wireless section 408. In the reception wireless section 408, the received radio-frequency signal is amplified by an amplifier 409, and converted into a baseband signal by a mixer 410. The baseband signal is inputted to a reception baseband section 411, converted into a reception data, and the converted reception data is outputted to a network through an interface 407. In a reception quality measurement section 416, reception quality is measured on the basis of information from the reception baseband section 411, and the reception quality is inputted to a TPC bit inserter 412.

When the user data Is inputted from the network, it is converted into a transmission data in the interface 407, and inputted to the TPC bit inserter 412. In the TPC bit inserter 412, when the reception quality is higher than a reference, TPC bit "11" is added, and when the quality is lower than the reference, "00" is added to the user data. The TPC bit insertion is performed at every 0.667 ms. The user data inserted with the TPC bit is inputted to the transmission baseband section 406 to be converted into a baseband signal. The baseband signal is inputted to the transmission wireless section 403. In the transmission wireless section 403, the base band signal is converted into a radio-frequency signal by the mixer 405, and the radio-frequency signal is amplified by the amplifier 404. The radio-frequency signal is inputted from the transmission wireless section 403 to the transmission antenna 402, and a wave is transmitted from the transmission antenna 402.

In the case of communication by such CDMA wireless access system, all the mobile transmission channels present in the same area use the same frequency to make communication. Therefore, when the transmission power of the transmitter is assumed as a constant value, the reception quality differs due to differences of wave propagation environment.

For example, a case is supposed in which a first mobile station and a second mobile station make communication simultaneously with the same base station. Then, wave propagation loss between the first mobile station and the base station is assumed as 60 [dB], and wave propagation loss between the second mobile station and the base station as 90 [dB]. Transmission power of the two mobile stations is +30 [dBm], reception power at the base station is +30 [dBm] for the first mobile station, and 60 [dBm] for the second mobile station. Compared to the reception power from the second mobile station, reception power from the first mobile station is higher by +30 [dB]. Therefore, since the signal from the first mobile station becomes an interference, signal from the second mobile station cannot be received.

Then, in order to avoid signal reception difficulty due to signal interference and maintain the same reception quality of all users, in the CDMA system, a technique has been known from the past to perform a closed loop high-speed transmission power control. In the high-speed transmission power control, at the base station, reception signal power to interference power ratio of reception signal is measured and compared with a reference value, and according to the comparison result, a TPC bit pattern for controlling the transmission power at the mobile station is determined.

In the high-speed transmission power control, according to communication rate, transmission power control width, and its maximum value and minimum value are determined at fixed values for all wireless channels.

However, adoption of the method in which the maximum value and minimum value of transmission power are fixed values in the conventional high-speed transmission power control has the following problems. That is, when an error occurs in signal reception for some reason, when operation of the transmitter-receiver itself becomes unstable, or when the user capacity that can be contained in the base station reaches a limit, there is the possibility that the mobile station transmits the maximum transmission power regardless of the extent of downward propagation loss. As a result thereof, there is a problem in that a deterioration occurs in the number of users that can be contained by the base station, that is, the user capacity.

SUMMARY OF THE INVENTION

It is therefore an object of the present invention to provide a CDMA wireless transmission apparatus, a CDMA wireless transmitter-receiver system and transmission power control method of the CDMA wireless transmission apparatus which are possible to control for changing maximum transmission power of a transmitter according to a propagation loss or a distance between the transmitter and receiver, suppress deterioration of user capacity to a minimum when signal reception becomes unstable at the receiver or when a transmitter-receiver performs an abnormal operation or the like.

Another object of the present invention is to provide a CDMA wireless transmission apparatus, a CDMA wireless transmitter-receiver system and transmission power control method of the CDMA wireless transmission apparatus capable of increasing the capacity on the verge of a limit of a user capacity.

According to a first aspect of the present invention which attains the above objects there is provided a CDMA wireless transmission apparatus for performing transmission power control, characterized by comprising: a propagation loss estimation means for estimating a propagation loss of a transmission signal by calculating propagation loss of a reception signal, and an adjusting means for adjusting a maximum transmission power of the transmission signal on the basis of the propagation loss estimated by the propagation loss estimation means.

Therefore, in CDMA wireless transmission, since a maximum value of transmission power can be changed according to wave propagation loss between the transmitter and receiver, even when signal reception is unstable, or the transmitter-receiver makes an abnormal operation, the transmitter is prevented from transmitting at the maximum transmission power, and the deterioration of the user capacity can be suppressed to a minimum.

Further, even in the case of immediately before the limit of user capacity, since the transmitter is prevented from transmitting at the maximum transmission power, the capacity can be increased.

According to a second aspect, in the first aspect, characterized by further comprising a transmission amplifier means for amplifying the transmission signal, wherein the adjusting means adjusts maximum transmission power of the transmission signal by designating a maximum amplification factor to the transmission amplifier means.

By this operation, in the transmission amplifier means, amplification of a radio-frequency signal to a value less than the instructed maximum amplification factor is performed.

According to a third aspect, in the first or second aspect, the propagation loss estimation means estimates the propagation loss on the basis of power of a control signal transmitted at a fixed power from the transmitting station of the reception signal.

According to a fourth aspect, in a CDMA wireless transmission apparatus for performing power control of transmission signal, characterized by comprising: a distance estimation means for estimating a distance from a transmitting station of reception signal to the wireless transmission apparatus, and an adjusting means for adjusting a maximum transmission power of the transmission signal on the basis of the distance estimated by the distance estimation means.

With this construction, distance between the transmission side and the reception side can be estimated, and respective transmitters can set sufficient maximum transmission power required. Furthermore, deterioration of user capacity can be suppressed to a minimum, and transmission power of the transmitter can be reduced.

According to a fifth aspect, in the fourth aspect, the distance estimation means estimates distance from the transmitting station of the reception signal to the wireless transmission apparatus on the basis of latitude and longitude of the transmitting station and latitude and longitude of the wireless transmission apparatus.

According to a sixth aspect, in the fourth or fifth aspect, characterized by further comprising a transmission amplifier means for amplifying the transmission signal, wherein the adjusting means adjusts maximum transmission power of the transmission signal by designating a maximum amplification factor to the transmission amplifier means.

According to a seventh aspect, in the sixth aspect, the adjusting means estimates the propagation loss of the transmission signal on the basis of the distance and determines the maximum amplification factor on the basis of the estimated propagation loss.

Therefore, by a calculation using an experimental value or a wave propagation model, a correspondence of the distance between the mobile station and the base station with the maximum amplification factor of the transmission signal is stored, and, using this relation, the wave propagation loss can be estimated.

According to an eighth aspect, there is provided a CDMA wireless transmitter-receiver system including a wireless transmission apparatus for performing power control of transmission signal, and a wireless reception apparatus for transmitting a first control signal for performing power control in the wireless transmission apparatus, wherein the wireless transmission apparatus comprises: a propagation loss estimation means for estimating a propagation loss of transmission signal by calculating a propagation loss of reception signal, a first transmission means for transmitting the estimated propagation loss information to the wireless reception apparatus, and a transmission amplifier means for amplifying the transmission signal, and the wireless reception apparatus comprises: a decision means for deciding a maximum transmission power of the transmission signal transmitted from the wireless transmission apparatus on the basis of propagation loss information received from the wireless transmission apparatus, and a second transmission means for transmitting the maximum transmission power information decided by the decision means to the wireless transmission apparatus, whereby the wireless transmission apparatus designates a maximum amplification amount to the transmission amplifier means on the basis of the maximum transmission power information received from the second transmission means.

According to a ninth aspect, in the eighth aspect, the propagation loss estimation means estimates the propagation loss on the basis of power of second control signal transmitted at a fixed power from the wireless reception apparatus.

According to a tenth aspect, there is provided a CDMA wireless transmitter-receiver system comprising a wireless transmission apparatus for performing power control of transmission signal and a wireless reception apparatus for transmitting a control signal for performing power control in the wireless transmission apparatus, wherein the wireless transmission apparatus comprises: a distance estimation means for estimating a distance from the wireless transmission apparatus to the wireless reception apparatus, a first transmission means for transmitting the distance information estimated by the distance estimation means to the wireless reception apparatus, and a transmission amplifier means for amplifying the transmission signal, and the wireless reception apparatus comprises: a reception means for receiving distance information transmitted from the first transmission means, a decision means for deciding a maximum transmission power of transmission signal transmitted from the wireless transmission apparatus on the basis of the received distance information, and a second transmission means for transmitting the maximum transmission power information decided by the decision means to the wireless transmission apparatus, wherein the wireless transmission apparatus designates a maximum amplification amount to the transmission amplifier means on the basis of the maximum transmission power information received from the second transmission means.

According to an 11th aspect, in the tenth aspect, the distance estimation means estimates a distance from the wireless transmission apparatus to the wireless reception apparatus on the basis of latitude and longitude of the wireless transmission apparatus and latitude and longitude of the wireless reception apparatus.

According to a 12th aspect, in the tenth aspect, the maximum transmission power information denotes maximum transmission power of transmission signal transmitted by the wireless transmission apparatus.

According to a 13th aspect, in the 12th aspect, the adjusting means estimates propagation loss of the transmission signal on the basis of the distance and determines the maximum transmission power on the basis of the estimated propagation loss.

According to a 14th aspect, there is provided a CDMA wireless transmitter-receiver system comprising a wireless transmission apparatus for performing power control of transmission signal and a wireless reception apparatus for transmitting a control signal for performing power control in the wireless transmission apparatus, wherein the wireless reception apparatus comprises: a distance estimation means for estimating a distance from the wireless transmission apparatus to the wireless reception apparatus, a decision means for deciding a maximum transmission power of transmission signal transmitted from the wireless transmission apparatus on the basis of the estimated distance, and a transmission means for transmitting the maximum transmission power information decided by the decision means, and the wireless transmission apparatus comprises a transmission amplifier means for amplifying the transmission signal, whereby the wireless transmission apparatus designates a maximum amplification amount to the transmission amplifier means on the basis of the maximum transmission power information received from the transmission means.

According to a 15th aspect, in the 14th aspect, the distance estimation means estimates a distance from the wireless transmission apparatus of the reception signal to the wireless reception apparatus on the basis of latitude and longitude of the wireless transmission apparatus and latitude and longitude of the wireless reception apparatus.

According to a 16th aspect, in the 14th aspect, the decision means estimates propagation loss of the reception signal on the basis of the distance, and determines a maximum transmission power of transmission signal transmitted in the wireless transmission apparatus on the basis of the estimated propagation loss.

According to a 17th aspect, there is provided a transmission power control method of a CDMA wireless transmission apparatus for performing power control of a transmission signal characterized by comprising: a propagation loss estimation step for estimating a propagation loss of transmission signal by calculating the propagation loss of a reception signal, and an adjusting step for adjusting a maximum transmission power of the transmission signal on the basis of the propagation loss estimated in the propagation loss estimation step.

According to an 18th aspect, in the 17th aspect, further comprising a transmission amplification step for amplifying transmission signal, and the adjusting step adjusts a maximum transmission power of transmission signal by designating a maximum amplification factor in the transmission amplification step.

Further, according to a 19th aspect, in the 17th or 18th aspect, the propagation loss estimation step estimates the propagation loss on the basis of power of control signal transmitted at a fixed power from the transmitting station of the reception signal.

According to a 20th aspect, there is provided a transmission power control method of a CDMA wireless transmission apparatus for performing power control of transmission signal characterized by comprising: a distance estimation step for estimating a distance from a transmitting station of a reception signal to the wireless transmission apparatus, and an adjusting step for adjusting maximum transmission power of a transmission signal on the basis of the distance estimated in the distance estimation step.

According to a 21st aspect, in the 20th aspect, the distance estimation step estimates the distance from the transmitting station to the wireless transmission apparatus on the basis of latitude and longitude of the transmitting station and latitude and longitude of the wireless transmission apparatus.

According to a 22nd aspect, in the 20th or 21st aspect, further comprising a transmission amplification step for amplifying the transmission signal, and the adjusting step adjusts a maximum transmission power of transmission signal by designating a maximum amplification factor in the transmission amplification step.

According to a 23rd aspect, in the 22nd aspect, the adjusting step estimates a propagation loss of the transmission signal on the basis of the distance, and determines the maximum amplification factor on the basis of the estimated propagation loss.

According to a 24th aspect, there is provided a transmission power control method of a wireless transmission apparatus in a CDMA wireless transmitter-receiver system for performing power control of transmission signal transmitted from the wireless transmission apparatus to a wireless reception apparatus characterized by comprising: a propagation loss estimation step for estimating a propagation loss of transmission signal in a propagation loss estimation means of the wireless transmission apparatus, a first transmission step for transmitting information about the estimated propagation loss to the wireless reception apparatus, a decision step for deciding a maximum transmission power of transmission signal transmitted from the wireless transmission apparatus on the basis of the information about the estimated propagation loss received from the wireless transmission apparatus in an adjusting means of the wireless reception apparatus, a second transmission step for transmitting the maximum transmission power information decided in the decision step, and a designation step for designating a maximum amplification amount to a transmission amplifier means of the wireless transmission apparatus for amplifying the transmission signal on the basis of the maximum transmission power information transmitted in the second transmission step.

According to a 25th aspect, in the 24th aspect, the propagation loss estimation step estimates the propagation loss on the basis of power of a second control signal transmitted at a fixed power from the wireless reception apparatus.

According to a 26th aspect, there is provided a transmission power control method of a wireless transmission apparatus in a CDMA wireless transmitter-receiver system for performing power control of transmission signal transmitted from the wireless transmission apparatus to a wireless reception apparatus characterized by comprising: a distance estimation step for estimating a distance from the wireless transmission apparatus to the wireless reception apparatus in position estimation means of the wireless transmission apparatus, a first transmission step for transmitting distance information estimated in the distance estimation step to the wireless reception apparatus, a reception step for receiving the transmitted distance information in the wireless reception apparatus, a decision step for deciding a maximum transmission power of transmission signal transmitted from the wireless transmission apparatus on the basis of distance information received in the reception step, a second transmission step for transmitting the maximum transmission power information decided in the decision step to the wireless transmission apparatus, and a designation step for designating a maximum amplification amount to a transmission amplifier means of the wireless transmission apparatus for amplifying the transmission signal on the basis of the maximum transmission power information transmitted in the second transmission step.

According to a 27th aspect, in the 26th aspect, the distance estimation step estimates a distance from the wireless transmission apparatus to the wireless reception apparatus on the basis of latitude and longitude of the wireless transmission apparatus and latitude and longitude of the wireless reception apparatus.

According to a 28th aspect, in the transmission power control method as described in the 26th aspect, the maximum transmission power information denotes a maximum transmission power of transmission signal transmitted in the wireless transmission apparatus.

According to a 29th aspect, in the 28th aspect, the adjusting step estimates a propagation loss of the transmission signal on the basis of the distance and determines the maximum transmission power on the basis of the estimated propagation loss.

According to a 30th aspect, there is provided a transmission power control method of a wireless transmission apparatus in a CDMA wireless transmitter-receiver system for performing power control of transmission signal transmitted from the wireless transmission apparatus to a wireless reception apparatus characterized by comprising: a distance estimation step for estimating a distance from the wireless transmission apparatus to the wireless reception apparatus in position estimation means of the wireless reception apparatus, a decision step for deciding a maximum transmission power of transmission signal transmitted from the wireless transmission apparatus on the basis of the estimated distance, a transmission step for transmitting the maximum transmission power information decided in the decision step to the wireless transmission apparatus, and a designation step for designating a maximum amplification amount in the wireless transmission apparatus to a transmission amplifier means of the wireless transmission apparatus for amplifying the transmission signal on the basis of the maximum transmission power information transmitted in the transmission step.

According to a 31st aspect, in the 30th aspect, the distance estimation step estimates a distance from the wireless transmission apparatus of the reception signal to the wireless reception apparatus on the basis of latitude and longitude of the wireless transmission apparatus and latitude and longitude of the wireless reception apparatus.

According to a 32nd aspect, in the 30th or 31st aspect, the decision step estimates a propagation loss of the reception signal on the basis of the distance, and determines a maximum transmission power of transmission signal transmitted in the wireless transmission apparatus on the basis of the estimated propagation loss.

With the above construction, the respective transmitters can set required sufficient maximum transmission powers. Further, the respective transmitters can set required sufficient maximum transmission powers.

Still further, deterioration of user capacity can be reduced to a minimum, and the transmission power of transmitter can be decreased.

The above and other objects, effects, features and advantages of the present invention will become more apparent from the following description of embodiments thereof taken in conjunction with the accompanying drawings.

DESCRIPTION OF THE PREFERRED EMBODIMENTS

In the following, preferred embodiments of the present invention will be described in detail with reference to the drawings.

Figure 3:
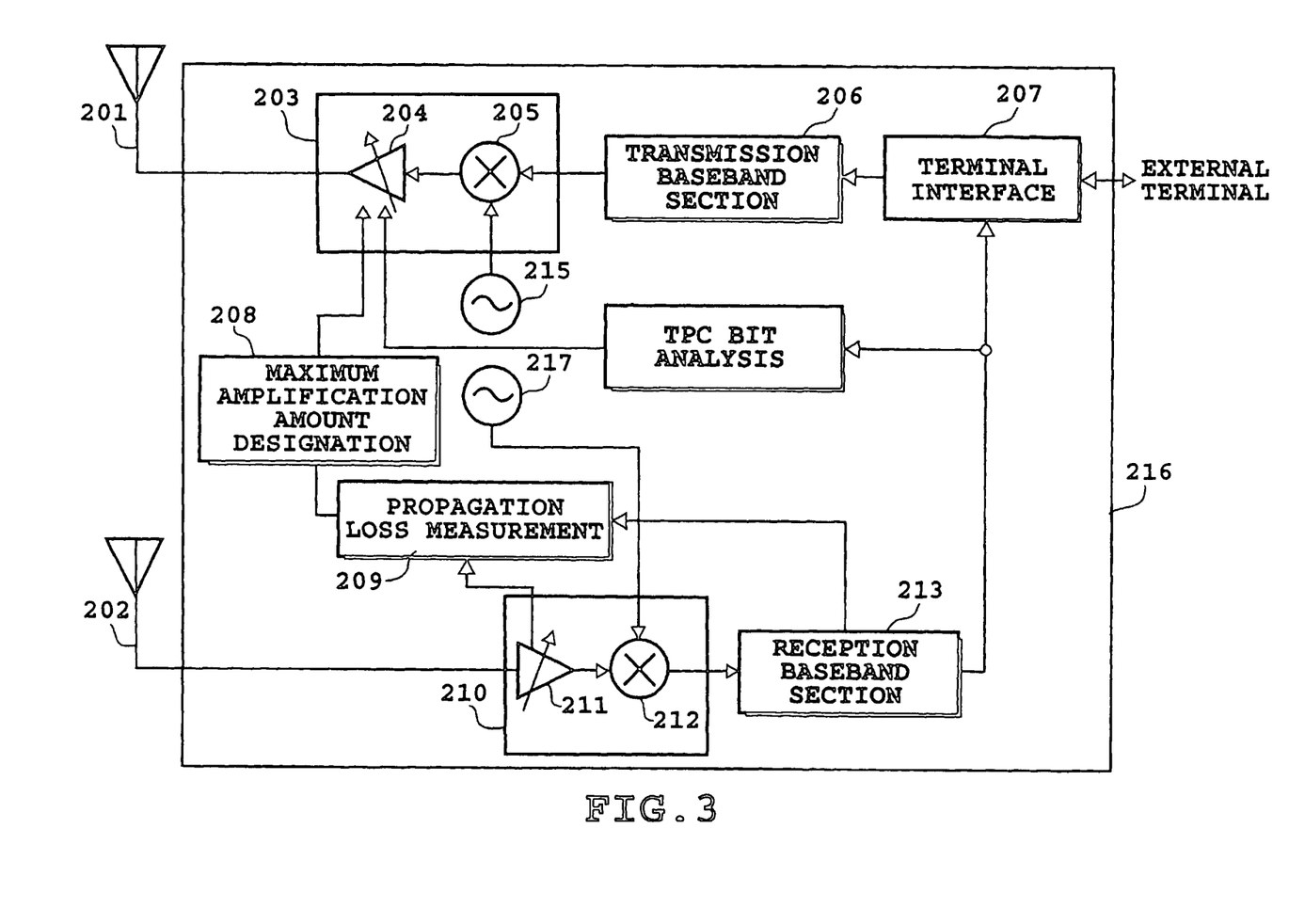
FIG. 3 is a diagram showing the construction of a mobile station of CDMA system according to an embodiment of the present invention.

FIG. 3 is a diagram showing an example of construction of a mobile station as a wireless transmission apparatus adopting a direct spreading CDMA system according to an embodiment of the present invention.

A radio-frequency signal inputted from a reception antenna 202 of a mobile station 216, that is, a reception signal, is inputted to a reception wireless section 210. In the reception wireless section 210, the reception signal is amplified in a reception amplifier 211, and converted to a baseband signal by a mixer 212. An amplification factor in the reception amplifier 211 is inputted to a wave propagation loss measurement section 209. The baseband signal is inputted to a reception baseband section 213, and converted into a user data. The user data is outputted to an external terminal through a terminal interface 207.

Further, in the reception baseband section 213, amplitude of the reception baseband signal is calculated, and amplitude information is inputted to the wave propagation loss measurement section 209. In the wave propagation loss measurement section 209, a calculation is made on the basis of the amplification factor of the reception amplifier 211, amplitude information of reception baseband signal and base station transmission power information to calculate a wave propagation loss of reception signal, thereby estimating the propagation loss of transmission signal. Here, base station transmission power information means an information about a transmission power of control signal transmitted from the base station to the mobile station. Since the control signal is transmitted at a fixed power, by including the base station transmission information in the control signal, the mobile station can receive the control signal to determine a wave propagation loss. When amplification factor of the reception amplifier 211 is $A_{Rx}$ [dB], a value of amplitude converted to power value in the reception baseband signal is $R_{BB}$ [dBm] and base station transmission power of the control signal is $T_{BTS}$ [dBm], wave propagation loss $L_{Prop}$ [dB] can be represented as $$L_{Prop} = T_{BTS} - R_{BB} + A_{Rx}. \quad (1)$$

Since transmission power information of the control signal transmitted from the base station side is inserted in the control signal, the mobile station can calculate $L_{Prop}$ at any time as necessary.

The wave propagation loss information is inputted in a maximum amplification amount designation circuit 208, and the maximum transmission power is decided. The maximum amplification amount designation circuit 208, by designating the maximum amplification amount to the transmission amplifier 204, adjusts the maximum transmission power of the transmission signal. The maximum transmission power $T_{Max}$ designated to the transmission amplifier 204, the wave propagation loss $L_{Prop}$, and a maximum amplification factor $A_{Tx-Max}$ are interrelated by the following equations.

$$A_{Tx-Max} = T_{Max} - T_{BB} \quad (2)$$

$$T_{Max} = R_{BTS-Req} + L_{Prop} + \alpha \quad (3)$$

Here, $T_{BB}$ [dBm] shows an amplitude of the transmission baseband output in the mobile station converted to power, $R_{BTS-Req}$ [dBm] a reception signal power required for the base station to correctly demodulate the reception signal, and $\alpha$ a correction amount for following a momentary change of wave.

Since $R_{BTS-Req}$ [dBm] is inserted in the control signal, the mobile station can calculate $T_{Max}$ and $A_{Tx-Max}$ at any time as necessary in the maximum amplification amount designation circuit 208.

An appropriate value of maximum transmission power of a mobile station may vary according to the distance from the base station or a change of circumferential environment. However, since a change of propagation loss associated with a change of distance or environment takes a relatively long time, it is effective for the mobile station to update $A_{Tx-Max}$ periodically.

Figure 4:
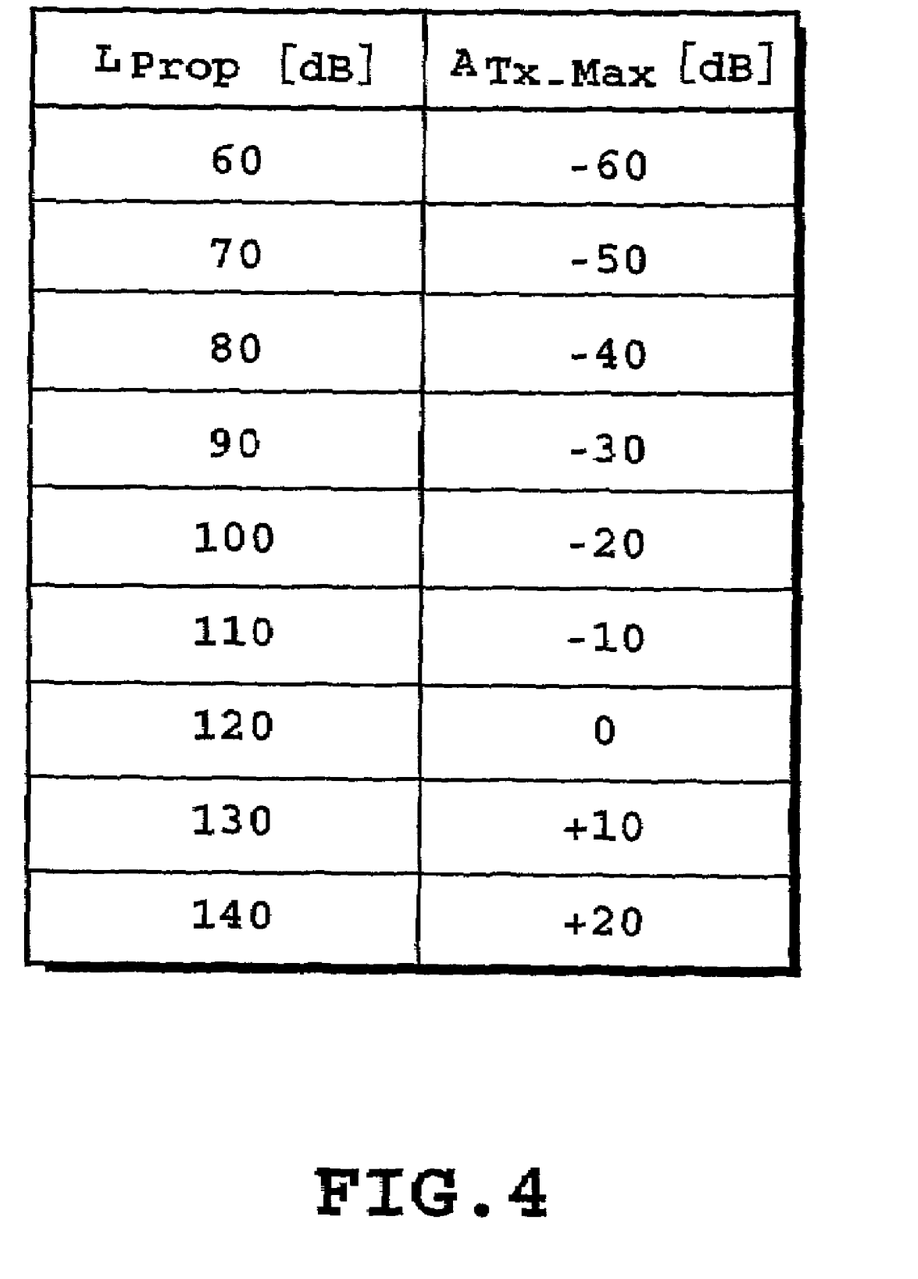
FIG. 4 is a diagram showing an example of correspondence of wave propagation loss and maximum transmission power.

In this formula, amplification factor of the transmission amplifier in the mobile station can be continuously changed. Further, as shown in the example in FIG. 4, correspondence of the wave propagation loss with the maximum transmission power can be previously stored in the mobile station to change the amplification factor in stages according to the correspondence.

When user data is inputted from an external terminal, it is converted to a transmission data by the terminal interface 207 and inputted to the transmission baseband section 206 to be converted to a baseband signal. The transmission baseband signal is inputted to a transmission wireless section 203. In the transmission wireless section 203, the baseband signal is converted to a radio-frequency signal by the mixer 205 and inputted to the transmission amplifier 204. In the transmission amplifier 204, an amplification is performed to a value less than the maximum amplification factor. The radio-frequency signal is emitted as a radiowave from the transmission antenna 201.

In another embodiment, a configuration may be used in which a wave propagation measurement section is provided at the mobile station side, a circuit for deciding the maximum transmission power at the base station side, propagation loss of transmission signal be estimated by calculating the propagation loss of reception signal in the mobile station and reporting the result to the base station side.

Figure 5:
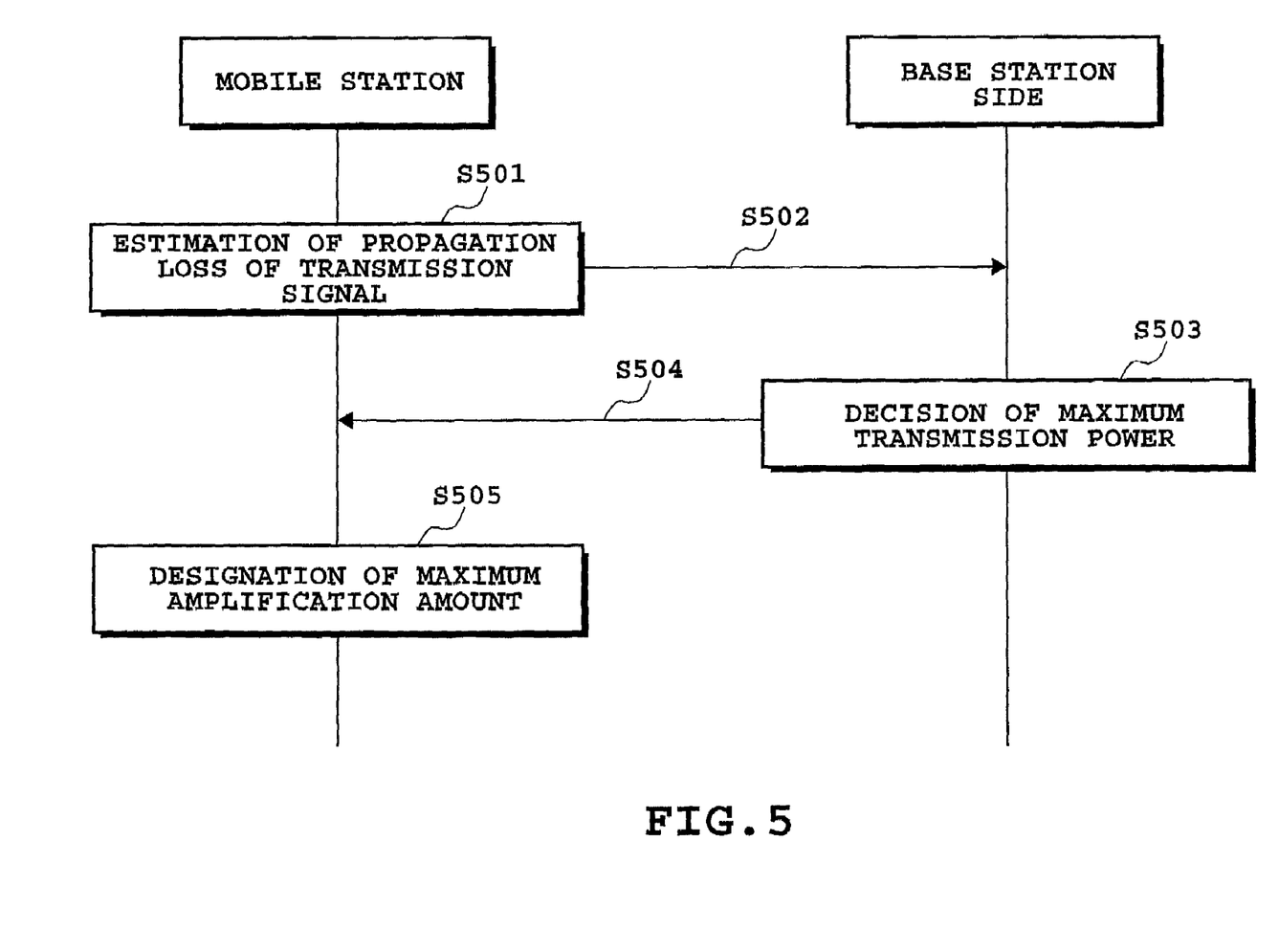
FIG. 5 is a flow chart showing procedure of transmission power control method according to an embodiment of the present invention.

Next, a transmission power control method performed using the mobile station constructed as above will be described with reference to the flow chart of FIG. 5.

In the propagation loss measurement section 209 of a mobile station 216, a propagation loss of transmission signal is estimated (step S501). The estimated propagation loss information is transmitted to the base station and a base station control equipment (step S502).

On the base station side which includes the base station control equipment, on the basis of the propagation loss information received from the mobile station 216, decides a maximum transmission power of transmission signal transmitted from the mobile station 216 (step S503). The decided maximum transmission power information is transmitted to the mobile station 216 (step S504).

The maximum amplification amount designation circuit 208 of the mobile station 216, on the basis of the maximum transmission power information transmitted from the base station, designates a maximum amplification amount to the transmission amplifier 204 for amplifying the transmission signal (step S505).

By this operation, in the CDMA system mobile station, since the maximum transmission power can be appropriately changed according to the amount of wave propagation loss, deterioration of user capacity can be reduced to a minimum.

In the present embodiment, a distance between the base station and the mobile station is calculated in the mobile station on the basis of position information, and the maximum transmission power is adjusted. The position information means information showing latitude and longitude of the mobile station or the base station.

Figure 6:
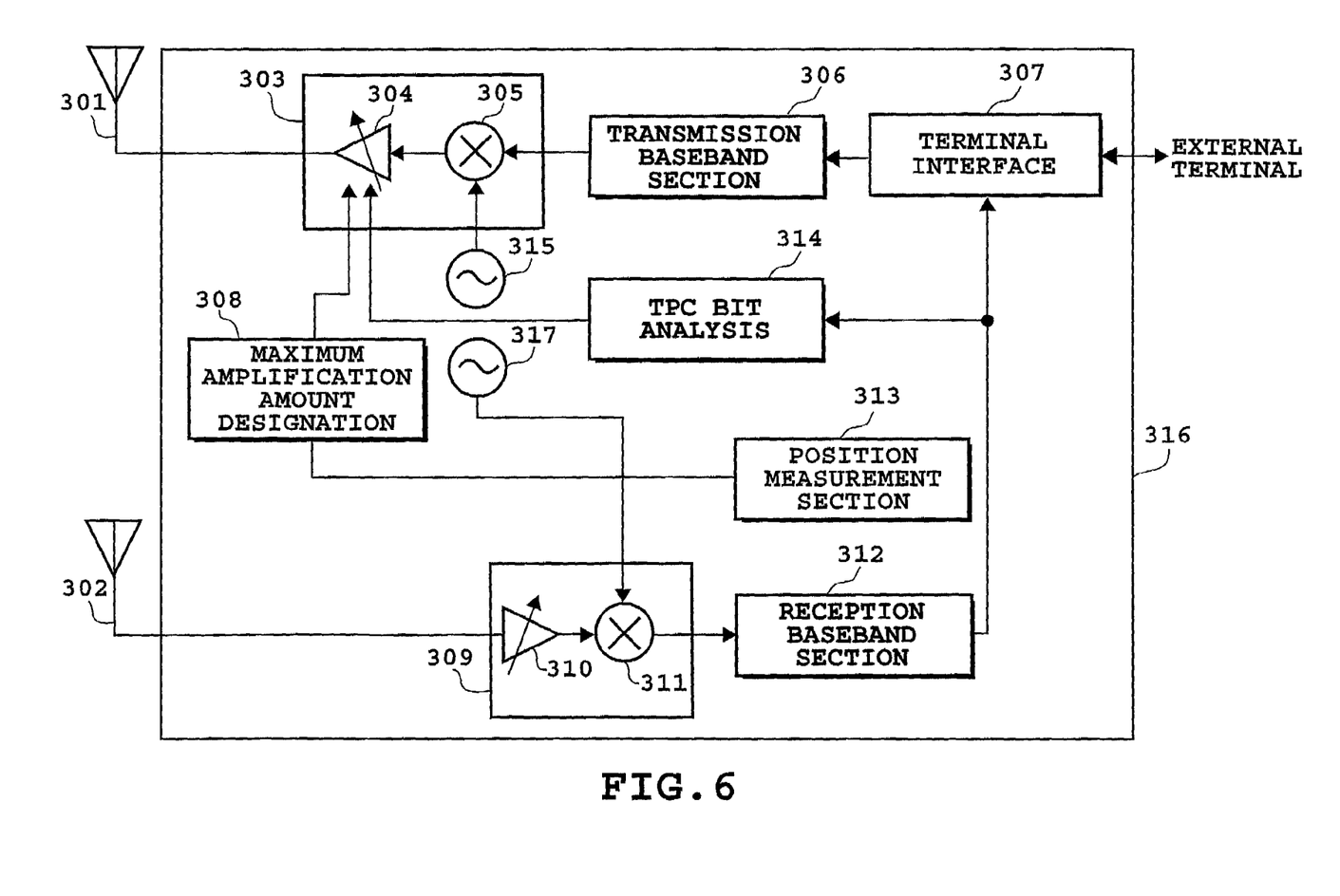
FIG. 6 is a diagram showing the construction of a mobile station of CDMA system according to an embodiment of the present invention.

FIG. 6 shows an example of construction of the mobile station as a wireless transmission apparatus of CDMA system according to the present embodiment.

In the present embodiment, the receiver is provided with a position measurement section 313, which, by using the position information of the mobile station and the base station, estimates a distance between the base station and the mobile station. When the earth is assumed as a sphere, a distance D [m] from the base station to the mobile station can be represented as $$D = R\delta \quad (4)$$

$$\cos\delta = \sin\theta_{BTS}\sin\theta_{MS} + \cos\theta_{BTS}\cos\theta_{MS}\cos\Delta\Phi.$$

Here, $\theta_{BTS}$ and $\theta_{MS}$ denote latitude of the base station and the mobile station, respectively, $\Delta\Phi$ a difference in latitude of the base station and the mobile station, respectively, $\delta$ [rad] an angle of base station and mobile station as viewed from the center of the earth, and R a radius of the earth when the earth is assumed as a sphere.

Position information of the mobile station can be calculated by using GPS (Global Positioning System) information. In this case, position information is calculated using a time difference in reaching time of GPS information transmitted from a plurality of satellites. Further, using the same technique, position information can also be calculated from a time difference in reaching time of signals transmitted from a plurality of base stations. Still further, a construction may be used in which position information of mobile station calculated at the base station side is reported to the mobile station. In this case, the base station calculates position information of the mobile station from a time difference in reaching time of signal transmitted from the mobile station to a plurality of base stations. On the other hand, position information of the base station is provided to the mobile station by including the position information of base station in the downward control signal transmitted from the base station side. The mobile station estimates the distance between the base station and the mobile station by the position measurement section 313 on the basis of acquired position information of the mobile station and the base station.

On the basis of the thus estimated distance, the maximum amplification amount designation circuit 308 decides a maximum transmission power, and performs adjustment of transmission power by designating the maximum amplification factor of the transmission amplifier.

Correspondence between the distance from the mobile station to the base station and the maximum amplification factor used by the transmission amplifier 304 may be determined by an experimental measurement, or be calculated same as in the previous example by the propagation loss by a typical wave propagation model. As an approximate model of wave propagation, Okumura model can be applied (Masaharu Hata "Empirical Formula for Propagation Loss in Land Mobile Radio Services" IEEE TRANSACTIONS ON VEHICULAR TECHNOLOGY, VOL. VT-29, NO. 3, AUGUST 1980). This model uses a method in which a distance characteristic in an urban area on a gentle ground configuration with rise and fall of ground of about more than 20 m is used as a reference for ground configuration and shelter to be factors of locational variation, and corrections from the reference characteristic are used for the other ground configuration and shelter. In this case, wave propagation loss can be represented as $$L = 69.55 + 26.16 \log f - 13.82 \log h_1 - a(h_2) + (44.9 - 6.551 \log h_1)\log d \quad (5)$$

$$a(h_2) = (1.11 \log f - 0.7)h_2 - (1.56 \log f - 0.8).$$

Where f [MHz] is a frequency (150 to 1500 MHz), $h_1$ [m] a base station antenna height (30 to 200 m), $h_2$ [m] a mobile station antenna height (1 to 10 m), and d [km] a propagation distance (1 to 20 km).

In other embodiment, a configuration may also be used in which distance from the base station to the mobile station measured by a position measurement apparatus of the mobile station is reported to the base station side.

Figure 7:
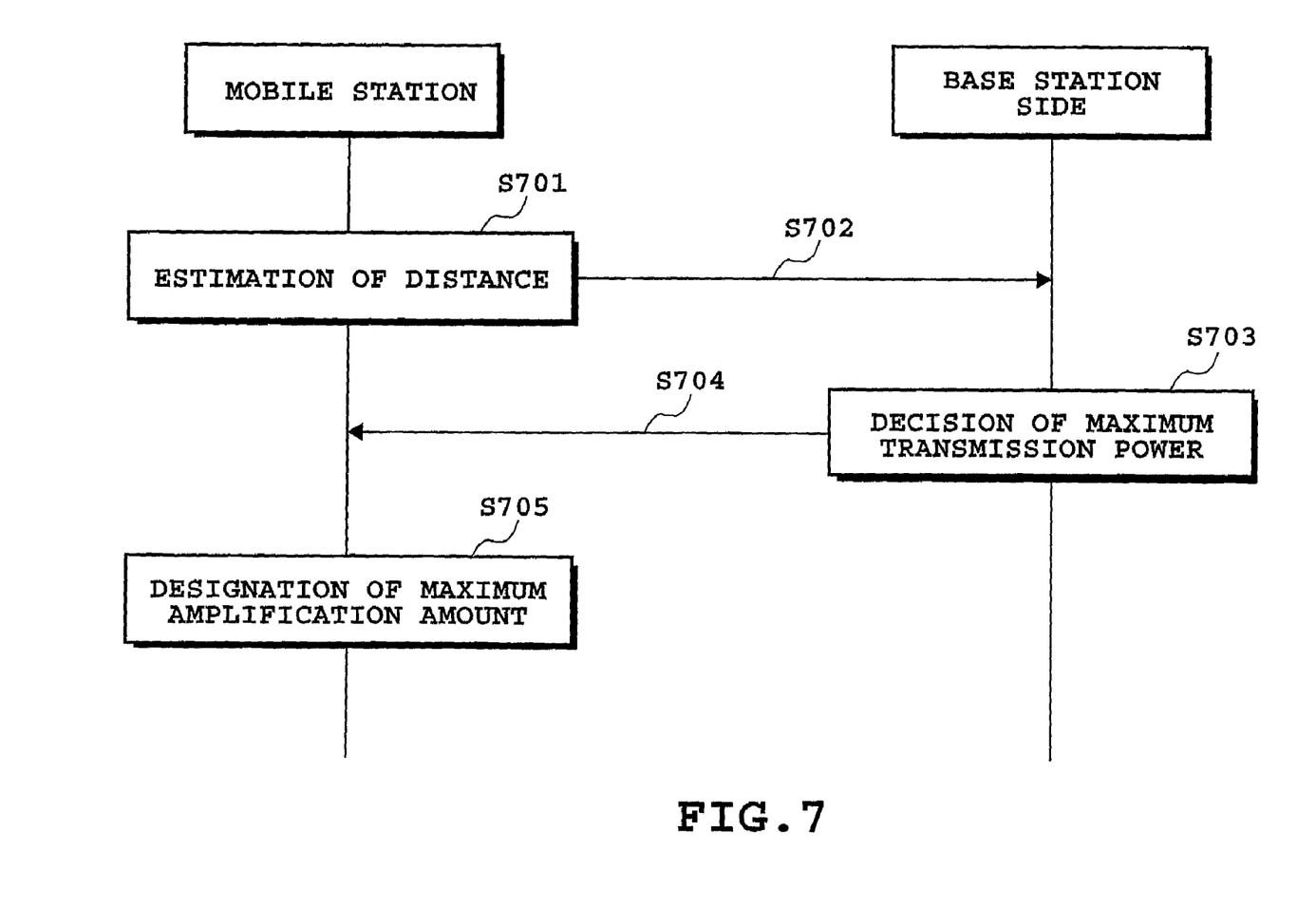
FIG. 7 is a flow chart showing procedure of transmission power control method according to an embodiment of the present invention.

Next, a transmission power control method performed using the mobile station constructed as above will be described with reference to the flow chart shown in FIG. 7

In the position measurement section 313 of the mobile station 316, a distance from the mobile station 316 itself to the base station is estimated (step S701). The estimated distance information is transmitted to the base station (step S702).

The base station, on the basis of the distance information received from the mobile station 316, decides a maximum transmission power of transmission signal transmitted from the mobile station 316 (step S703). The decided maximum transmission power information is transmitted to the mobile station 316 (step S704).

The maximum amplification amount designation circuit 308 of the mobile station 316, on the basis of the maximum transmission power information transmitted from the base station, designates a maximum amplification amount to the transmission amplifier 304 for amplifying the transmission signal (step S705)

Preferred embodiments of the present invention have been described above, however, it is needless to say that the present invention is not limited only to these embodiments, but can also be used in various other embodiments. For example, a configuration may be used in which a position measurement apparatus is provided at the base station side, distance between the base station and the mobile station is calculated, the information is included in the control signal and reported to the mobile station. Also in this case, the maximum transmission power information of the mobile station adjusted in the base station side can be transmitted.

Yet further, in the above embodiments, the maximum transmission power of the mobile station is limited, however, alternatively, a configuration may also be used in which the same invention is applied to the base station side to limit the maximum transmission power of the base station transmission wave.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A CDMA wireless transmission apparatus for performing closed loop power control of transmission signal from the CDMA wireless transmission apparatus characterized by comprising :
    a propagation loss estimation means for estimating a propagation loss of said transmission signal by calculating propagation loss of a reception signal,
    a transmission amplifier means for amplifying said transmission signal on the basis of received transmission power control bits, and
    an adjusting means for adjusting a maximum transmission power of said transmission signal used to limit a transmission power of said transmission signal determined by received transmission power control bits on the basis of the propagation loss estimated by said propagation loss estimation means, wherein said transmission amplifier means limits said transmission power so as to be less than said maximum transmission power regardless of said received transmission power control bits, wherein said maximum transmission power is obtained by the following equation:

$$T_{Max}=R_{BTS\_Req}+L_{Prop}+\alpha$$

where $T_{Max}$ is said maximum transmission power, $R_{BTS\_Req}$ is a reception signal power required for the CDMA wireless transmission apparatus to correctly demodulate the reception signal, $L_{Prop}$ is wave propagation loss and $\alpha$ is a correction amount for following fluctuation of wave.

2. A CDMA wireless transmitter-receiver system including a wireless transmission apparatus for performing closed loop power control of a transmission signal transmitted from the CDMA wireless transmission apparatus, and a wireless reception apparatus for transmitting a first control signal for performing power control in said wireless transmission apparatus, wherein said wireless transmission apparatus comprises:

a propagation loss estimation means for estimating a propagation loss of said transmission signal by calculating a propagation loss of a reception signal, a first transmission means for transmitting said estimated propagation loss information to said wireless reception apparatus, and a transmission amplifier means for amplifying said transmission signal on the basis of received transmission power control bits, and said wireless reception apparatus comprises:

a decision means for deciding a maximum transmission power of said transmission signal transmitted from said wireless transmission apparatus on the basis of propagation loss information received from said wireless transmission apparatus, and a second transmission means for transmitting said first control signal including said maximum transmission power information decided by said decision means to said wireless transmission apparatus, whereby said wireless transmission apparatus designates a maximum amplification amount used to limit a transmission power of said transmission signal determined by received power control bits to said transmission amplifier means on the basis of said maximum transmission power information received from said second transmission means, wherein said transmission amplifier means limits said transmission power so as to be less than said maximum transmission power regardless of said received transmission power control bits, wherein said maximum transmission power is obtained by the following equation:

$$T_{Max}=R_{BTS\_Req}+L_{Prop}+\alpha$$

where $T_{Max}$ is said maximum transmission power, $R_{BTS\_Req}$ is a reception signal power required for the wireless transmission apparatus to correctly demodulate the reception signal, $L_{Prop}$ is wave propagation loss and $\alpha$ is a correction amount for following fluctuation of wave.

3. A transmission power control method of a CDMA wireless transmission apparatus for performing closed loop power control of a transmission signal from the CDMA wireless transmission apparatus characterized by comprising:

a propagation loss estimation step for estimating a propagation loss of said transmission signal by calculating propagation loss of a reception signal, a transmission amplifying step for amplifying said transmission signal on the basis of received transmission power control bits, and an adjusting step for adjusting a maximum transmission power of the transmission signal used to limit a transmission power of said transmission signal determined by received transmission power control bits on the basis of propagation loss estimated in said propagation loss estimation step, wherein said transmission power is limited in the transmission amplifying step so as to be less than said maximum transmission power regardless of said received transmission power control bits, wherein said maximum transmission power is obtained by the following equation:

$$T_{Max}=R_{BTS\_Req}+L_{Prop}+\alpha$$

where $T_{Max}$ is said maximum transmission power, $R_{BTS\_Req}$ is a reception signal power required for the CDMA wireless transmission apparatus to correctly demodulate the reception signal, $L_{Prop}$ is wave propagation loss and $\alpha$ is a correction amount for following fluctuation of wave.

4. A transmission power control method of a wireless transmission apparatus in a CDMA wireless transmitter-receiver system for performing closed loop power control of a transmission signal transmitted from said wireless transmission apparatus to a wireless reception apparatus characterized by comprising:

a propagation loss estimation step for estimating a propagation loss of said transmission signal in a propagation loss estimation means of said wireless transmission apparatus, a first transmission step for transmitting information about said estimated propagation loss to said wireless reception apparatus, a decision step for deciding a maximum transmission power of said transmission signal used to limit a transmission power of said transmission signal determined by transmission power control bits on the basis of said information received from said wireless transmission apparatus in an adjusting means of said wireless reception apparatus, a second transmission step for transmitting said transmission power control bit and said maximum transmission power information decided in said decision step, a designation step for designating a maximum amplification amount to a transmission amplifier means of said wireless transmission apparatus, and a transmission amplifying step for amplifying said transmission signal on the basis of received transmission power control bits in said transmission amplifier means, wherein said transmission power is limited so as to be less than said maximum transmission power regardless of said received transmission power control bits, wherein said maximum transmission power is obtained by the following equation:

$$T_{Max}=R_{BTS\_Req}+L_{Prop}+\alpha$$

where $T_{Max}$ is said maximum transmission power, $R_{BTS\_Req}$ is a reception signal power required for the wireless transmission apparatus to correctly demodulate the reception signal, $L_{Prop}$ is wave propagation loss and $\alpha$ is a correction amount for following fluctuation of wave.

* * * * *